United States Patent [19]
Carr et al.

[11] Patent Number: 5,050,017
[45] Date of Patent: Sep. 17, 1991

[54] MEMORY GUIDED MAGNETIC TAPE TRACKING

[75] Inventors: Thomas D. Carr, Cardiff; James R. Harrer, San Diego, both of Calif.

[73] Assignee: Eastman Kodak Company, Rochester, N.Y.

[21] Appl. No.: 397,547

[22] Filed: Aug. 23, 1989

[51] Int. Cl.⁵ .............................................. G11B 5/584
[52] U.S. Cl. .................................... 360/77.12; 360/110
[58] Field of Search .............. 360/77.01, 77.12, 78.01, 360/78.02, 121, 77.03, 77.04, 110

[56] References Cited

U.S. PATENT DOCUMENTS

| | | | |
|---|---|---|---|
| 4,176,381 | 11/1979 | de Niet et al. | 360/77.12 |
| 4,390,917 | 6/1983 | Watanabe | 360/78.02 |
| 4,639,796 | 1/1987 | Solhjell | 360/77.12 |
| 4,677,505 | 6/1987 | Nukada et al. | 360/77.12 |
| 4,685,005 | 8/1987 | Fields, Jr. | 360/121 |

Primary Examiner—Aristotelis M. Psitos
Assistant Examiner—David L. Robertson
Attorney, Agent, or Firm—Robert F. Cody

[57] ABSTRACT

A self-aligning configuration for establishing precisely where each of any number of tracks is to be recorded on a magnetic tape, utilizes therefor a photosensitive element (of perhaps even coarser structure than that of a given track), the signal output of which constitutes a measure of the location of the track(s). Thereafter, tracking control, say during playback, is pursuant to such signal, which is memorized.

8 Claims, 3 Drawing Sheets

MEMORY GUIDED MAGNETIC TAPE TRACKING

BACKGROUND OF THE INVENTION

1. Field of the Invention

This invention relates in general to magnetic recording and more particularly to improved apparatus for providing tracking control during the playback of recorded signal information.

2. Description Relative to the Prior Art

There is a trend toward the packing of greater and greater amounts of data on magnetic tape. Implicit in such trend is the requirement that data tracks on such tape be as narrow, and as closely spaced together, as possible. It is clearly of concern, therefore, that during playback of recorded information, that the information so recovered be from the correct track, and not from a neighboring one.

It is known in the art to record tracking control signals on a magnetic tape as a vehicle for preventing head-to-tape wander during playback of information recorded on the tape. Representative prior art in this connection may be found in U.S. Pat. No. 3,474,432, which depicts the use of various prerecorded frequencies in respective tracks, the signals being mixed in such a way as to cause head position error signals to be generated in response to head-to-tape wander. Similarly, more recently issued U.S. Pat. No. 4,258,398 calls for the use of paired pre-recorded tracks as signal-sources for head orienting/positioning in connection with a multitrack configuration. Other and varied tracking control techniques have been demonstrated and taught in the art, albeit that such techniques exhibit less than optimally tight-control and, accordingly, are wanting when it comes to the matter of sensitivity.

SUMMARY OF THE INVENTION

The present invention provides a self-aligning configuration for establishing precisely where each of any number of tracks is to be recorded on a magnetic tape, and utilizes therefor a photosensitive element (of perhaps even coarser structure than that of a given track), the signal output of which constitutes a measure of the location of the track(s). Thereafter, tracking control, say during playback, is pursuant to such signal, which is memorized. In a presently preferred embodiment of the invention, the photosensitive element is a charge-coupled device (CCD). A set-up tape having a pre-recorded track (or tracks) thereon is read, with signals corresponding to the head position for such pre-recorded track, or tracks, being stored in respective PROMs. Given that such PROMs are set-up with "true" track location information, recording and playback thereafter is under control of output signals from the PROMs.

The invention will be described with reference to the figures, wherein

FIG. 1 is a schematic view, partly in perspective, showing a first embodiment of the invention, FIG. 2 is a plan view of a tape format which, together with the showing of FIG. 1, provides an easy-to-comprehend teaching of the embodiment of FIG. 1, and FIG. 3 is a schematic block diagram of a presently preferred form of the invention.

DETAILED DESCRIPTION

Figure 1:
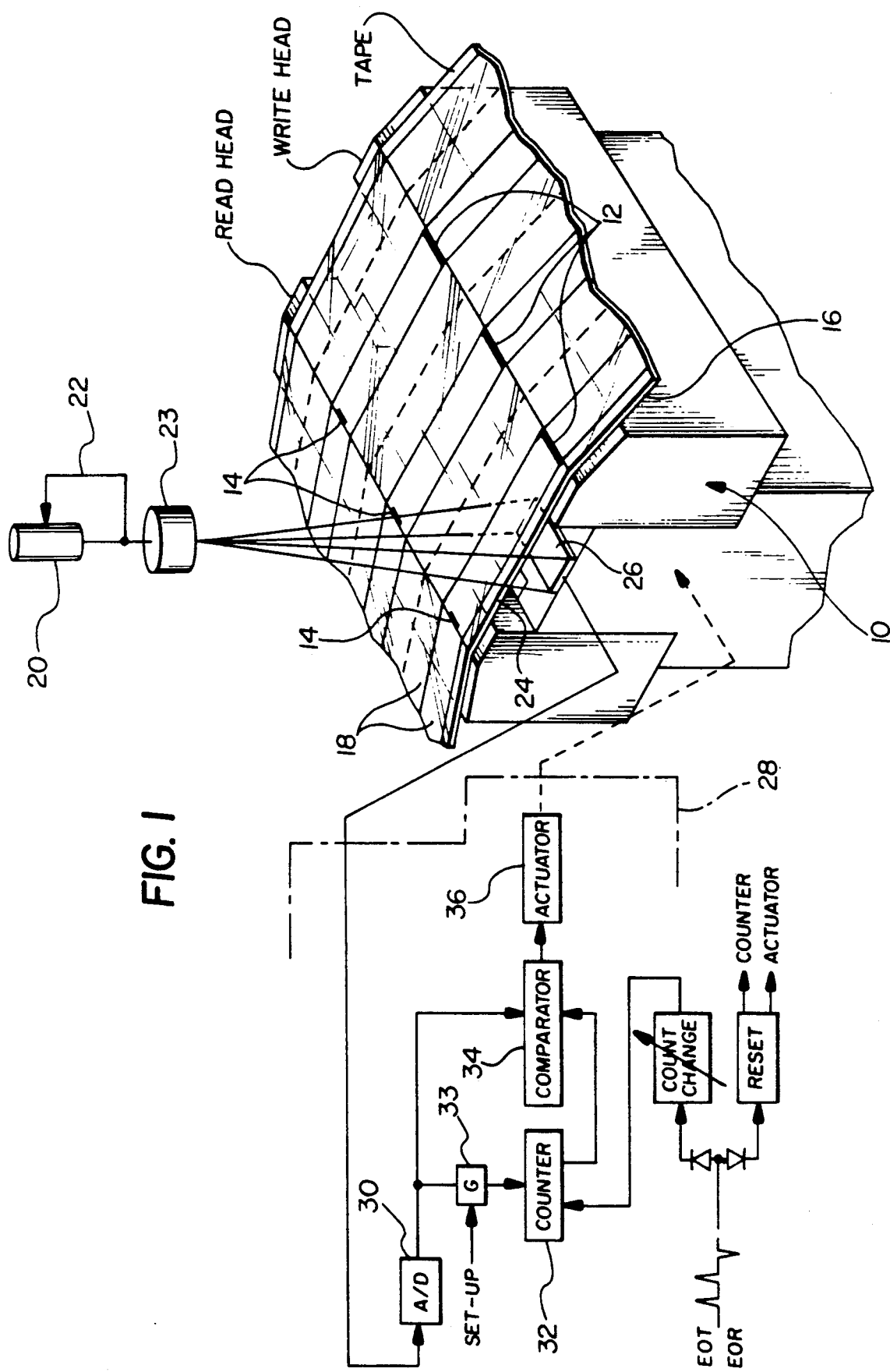
Figure 2:
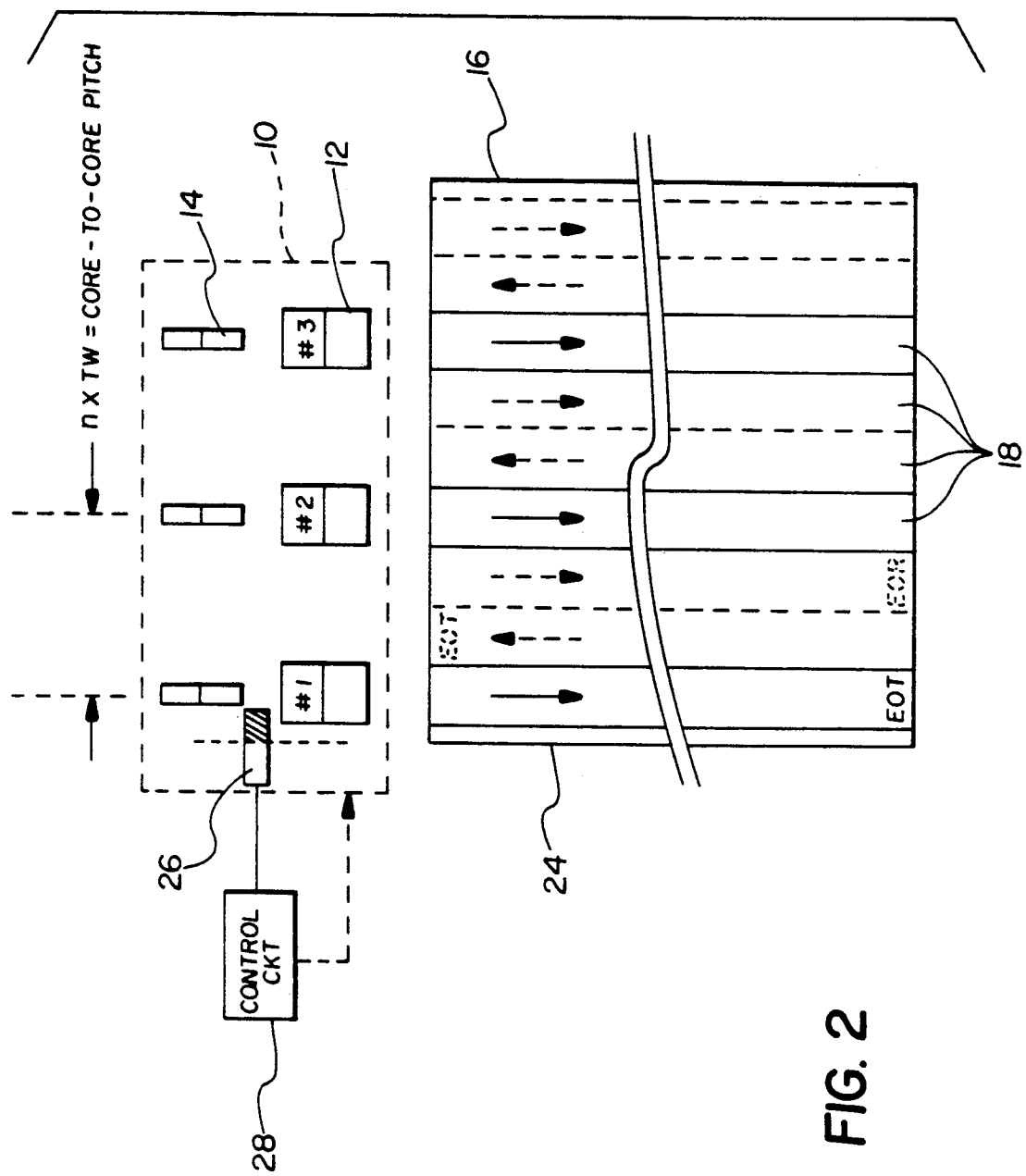

Referring to FIGS. 1 and 2, a multitrack Read/Write head 10 is depicted as having, by way of example, three Write cores 12, and three corresponding Read cores 14. Note that the Read cores 14 have narrower geometries than their corresponding Write cores 12. The spacing between Write cores 12, in this embodiment of the invention, is such that the core pitch is n (number of Write cores) times the track width (TW), thereby effecting what would be contiguous tracks on recording tape 16. Because they have narrower geometries than their corresponding Write cores 12, the Read cores are ensconced "within" recorded tracks 18, rather than overlapping such tracks. This means that the Read cores during playback do not pick up unwanted signals from adjacent tracks.

A laser 20, utilizing feedback 22 for purposes of uniform output, illuminates, via optics 23, the edge 24 of the tape 16, and part of a photosensor 26, which partially falls in the shadow of the edge of the tape. The output of the photosensor 26 is applied to a control circuit 28 for controlling the relative trackwise positioning between the head 10 and tape 16.

Operation is as follows: with the tape 16 threaded up, the tape edge 24 shadows the photosensor 26 so as to cause its signal output to be at a certain level. Such signal level is quantized (analog-to-digital converter 30), and then applied to both a counter 32 (via a set-up gate 33) and a comparator 34. The counter 32 effectively memorizes the widthwise start location of the tape, and thereafter (as the tape 16 is run) has its output continuously compared to the instantaneous widthwise location of the tape. As a result of such comparison, an actuator 36 (solenoid or equivalent) continuously keeps the head 10 (Write cores 1, 2, 3 on their "self-aligned" tracks.

At the end (EOT) of the first set of three tracks being recorded, a "count change" is applied to the counter 32, thereby causing the comparator 34 to produce a head-position correction signal for application to the actuator 36. Attendantly, the head indexes over so that a second set of three tracks may be recorded, this time under control of the up-dated counter 32 output. The second set of three tracks is contiguous with respective tracks of the first set of three tracks, and in perfect alignment therewith as a result of the comparison between the up-dated count of the counter 32 and the instantaneous output of the A/D converter 30. Again, at the end of the second set of three tracks (EOT), a new count-change is effected, whereby a third set of three tracks is recorded in like manner.

At the end of the third set of three tracks, an end-of-recording signal (EOR) is generated, causing the counter 32 and the actuator 36 to reset to their respective start conditions, in readiness for playback, or a new recording.

Figure 3:
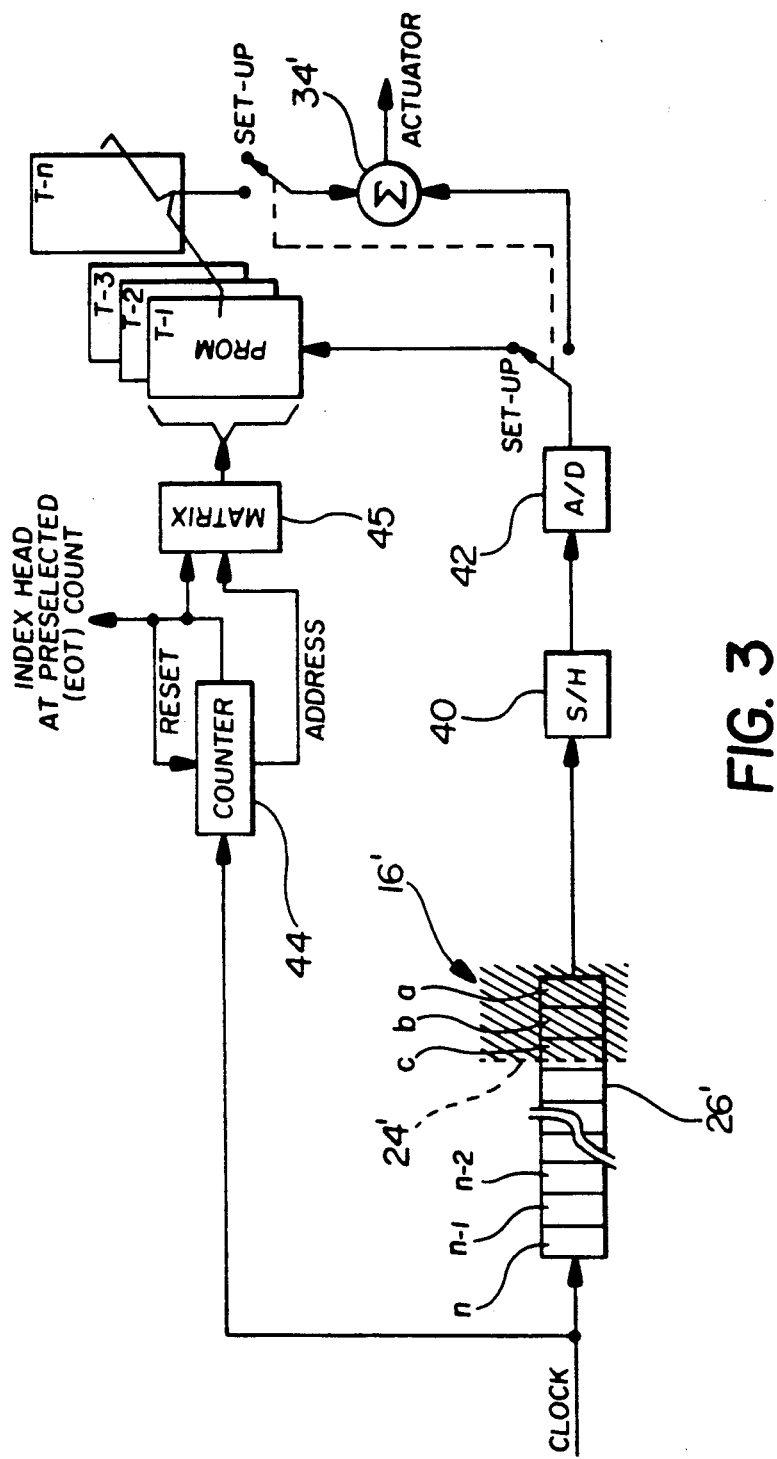

As aforesaid, the invention in its presently preferred form utilizes a CCD, cooperative with PROMs, for set-up and control of tracking: With reference to the schematic showing of FIG. 3, consider the edge 24' of set-up tape 16' as shadowing a linear CCD 26', as indicated. (Character designations in FIG. 3, which correspond to related parts appearing in FIG. 1, are indicated by the use of primes.) Given that the set-up tape is run while tracking a first pre-recorded track of the set-up tape, the CCD is clocked to produce periodic samples (sample and hold circuit 40) of the location of the edge 24' of the set-up tape. Such samples are quantized (analog-to-digital converter 42), and applied, in cooperation with a PROM selecting matrix 45 (under addressing control of a counter 44), to a first PROM T-1. (Note that the edge 24' of the tape 16' falls within a cell c of the CCD 26'. While the cells a, b of the CCD 26' produce analog signals of one level, and the cells n, n−1, n−2 produce analog signals of a different level, the CCD cell c produces an analog signal level precisely indicative of the location of the tape edge 24' therewithin, and can be used for precise tracking control, irrespective of tight trackwidth dimensions.) Thus, during the first running traversal of the tape 16', the PROM T-1 is loaded with tracking control information corresponding to the location of a first track that is widthwise of the tape 16'.

At a pre-selected count of the counter 44, which count corresponds to an end-of-tape (EOT) situation, the counter is reset, and the head indexed to a new location corresponding to a second track of the set-up tape. Attendantly, the edge 24' of the tape 16' shadows a new cell of the CCD 26'. As the tape is run again, the CCD is again clocked to produce a new set of tracking control signal information that is loaded into a second PROM T-2, cooperative with the PROM-selecting matrix 45, and under addressing control of the counter 44.

The above procedure is repeated for each track location of the set-up tape, so that eventually each PROM T-1 through T-N is loaded with tracking control signal information respective of the recorded set-up tracks. With the PROMs so set-up, the set-up tape is then removed . . . and two set-up switches thrown. Now, when a tape to be recorded is run, the clocked output of the CCD 26' is continually compared (comparator 34') with memorized tracking information stored in the PROM that is respective of the track being recorded. Attendantly, tracking control for both recording and playback is as tight as was employed with the set-up tape.

The invention has been described in detail with particular reference to a presently preferred embodiment, but it will be understood that variations and modifications can be effected within the spirit and scope of the invention. For example, while various compensating delay devices are not indicated in connection with either FIGS. 1 or 3, it is obvious that such may be provided as required.

What is claimed is:

1. Tracking control apparatus for use with magnetic tape, said apparatus comprising
   a. magnetic head means,
   b. means for producing relative motion, widthwise of said tape, between said magnetic head means and said tape,
   c. photosensitive means disposed proximate the edge of said tape so as to fall at least partially in the shadow of the edge of said tape,
   d. means for illuminating the edge of said tape,
   e. first means cooperative with said photosensitive means for effectively memorizing therefrom a signal, updated a function of location along the length of said tape, that corresponds to reference positions relative of said head means and said tape, and
   f. second means cooperative with said photosensitive means for comparing the instantaneous output of said photosensitive means with said stored signal of said means for storing, thereby to provide an error signal for application to said means for providing relative motion between said head means and said tape.

2. The apparatus of claim 1 wherein said apparatus further comprises means for controlling the uniformity of the output of said means for illuminating.

3. The apparatus of claim 1 wherein said magnetic head means is a multitrack head comprising spacially aligned respective Write and Read cores, said Read cores having trackwise dimensions substantially less than their respective Write cores.

4. The apparatus of claim 3 further comprising means for storing additional variable signals corresponding to additional reference positions for said head means, and means for periodically comparing different ones of said stored signals with said instantaneous output of said photosensitive means, thereby to effect recording and playback of interleaved tracks of said tape.

5. The apparatus of claim 4 wherein said additional signals are such that the interleaved tracks are contiguous with respect to each other.

6. Apparatus for providing tracking control of a magnetic head adapted to record plural tracks along the length of a magnetic tape, said apparatus comprising
   a. a bank of PROMs, each storing a plurality of signals respective of lengthwise reference locations along said tape respectively corresponding to reference locations for said head relative crosswise of said tape,
   b. a linear charge-coupled device supported by said head proximate the edge of said tape,
   c. means for illuminating the edge of said tape so that said charge-coupled device falls partially in the shadow of said tape,
   d. means for operating such charge-coupled device and respective ones of said PROMs,
   e. means for comparing the respective outputs of said charge-coupled device and the PROM being operated, and
   f. means cooperative with said means for comparing for varying the relative positions of said tape and head in accordance with the output of said means for comparing.

7. The apparatus of claim 6 wherein said apparatus further comprises means for controlling the uniformity of the output of said means for illuminating.

8. The apparatus of claim 6 further comprising a magnetic head, said head being a multitrack head comprising spacially aligned respective Write and Read cores, said Read cores having trackwise dimensions substantially less than their respective Write cores.

* * * * *